United States Patent
Lu et al.

(10) Patent No.: US 10,072,197 B2
(45) Date of Patent: Sep. 11, 2018

(54) CROSSLINKED HIGH MOLECULAR WEIGHT POLYMERS FOR USE IN WATER-BASED DRILLING FLUIDS

(71) Applicants: CNPC USA Corporation, Houston, TX (US); CNPC Chuanqing Drilling Engineering Company Limited, Chengdu (CN)

(72) Inventors: Meng Lu, Sugarland, TX (US); Guang Chang Ma, Guanghan (CN); Burhan Hoxha, Houston, TX (US); Feng Feng Xiao, Chengdu (CN)

(73) Assignees: CNPC USA Corporation, Houston, TX (US); CNPC Chuanqing Drilling Engineering Company Limited, Chengdu, Sichuan Province (CN)

( * ) Notice: Subject to any disclaimer, the term of this patent is extended or adjusted under 35 U.S.C. 154(b) by 106 days.

(21) Appl. No.: 14/878,754

(22) Filed: Oct. 8, 2015

(65) Prior Publication Data
US 2017/0101573 A1 Apr. 13, 2017

(51) Int. Cl.
C09K 8/12 (2006.01)
C09K 8/24 (2006.01)

(52) U.S. Cl.
CPC .......... *C09K 8/12* (2013.01); *C09K 8/24* (2013.01); *C09K 2208/12* (2013.01)

(58) Field of Classification Search
None
See application file for complete search history.

(56) References Cited

U.S. PATENT DOCUMENTS

| | | | |
|---|---|---|---|
| 4,702,319 A | 10/1987 | Bock et al. | |
| 5,789,349 A * | 8/1998 | Patel | C09K 8/24 507/118 |
| 2004/0152602 A1* | 8/2004 | Boles | C09K 8/74 507/100 |
| 2004/0229755 A1* | 11/2004 | Thaemlitz | C09K 8/24 507/121 |
| 2005/0096232 A1 | 5/2005 | Patel et al. | |
| 2005/0123639 A1* | 6/2005 | Ring | B21D 39/04 425/392 |
| 2009/0036330 A1 | 2/2009 | Carbajal et al. | |
| 2009/0264321 A1* | 10/2009 | Showalter | C09K 8/512 507/219 |

FOREIGN PATENT DOCUMENTS

WO 2004090067 A2 10/2004

OTHER PUBLICATIONS

Jamshidi, H., et al., Synthesis and Characterization of Acrylamide-Based Anionic Copolymer and Investigation of Solution Properties, Advances in Material Science and Engineering, 6 pgs., vol. 2014, Hindawi Publishing Corporation Article ID 728675.
Liu, Xinxin, et al., Synthesis and performance of fluid loss agents based on different acrylamide monomers, J Petrol Explor Prod Technol, Feb. 13, 2015, 7 pgs., Springer.

* cited by examiner

*Primary Examiner* — John J Figueroa
(74) *Attorney, Agent, or Firm* — Ramey & Schwaller, LLP

(57) ABSTRACT

Crosslinked high molecular weight acrylamide and 2-acrylamido-2-methylpropane sulfonic acid copolymers in inverse emulsion form act as inhibitive and encapsulating agents for water-based drilling fluids system. The crosslinked copolymer are particularly useful for high salt, high density drilling fluids in high temperature and high pressure applications.

14 Claims, 2 Drawing Sheets

CROSSLINKED HIGH MOLECULAR WEIGHT POLYMERS FOR USE IN WATER-BASED DRILLING FLUIDS

FIELD

The disclosure relates generally to oil production. The disclosure relates specifically to water-based drilling fluids.

BACKGROUND

Previous encapsulating polymers for water-based drilling fluids are not stable at high temperature. When exposed to high temperatures for a prolonged time, the polymers exhibit decreased viscosity. The decreased viscosity affects encapsulation ability, rheology, and the ability to work with fluid loss agents in the drilling fluid to decrease fluid loss.

The ability of a drilling fluid to carry cuttings increases as viscosity increases. If the drilling fluid is not viscous enough, the cuttings will be brought to the surface. If the drilling fluid is not viscous enough, it may migrate into the formation. Correct viscosity assists in forming a wall cake by creating a film of particles and sealing the wall. A drilling fluid should not be too viscous because that will prevent the cuttings from settling out in the mud pits.

Previously known encapsulating polymers for water-based drilling fluids were not stable at high temperatures. After aging at a high temperature (>300° F.) for an extended period (16 hours), the viscosity of the polymer solution decreases significantly due to polymer degradation. Less viscous fluids flow easier and the loss of viscosity had several impacts on the properties of the drilling fluid. First, the fluids partially lose their inhibitive and encapsulating capacity. Second, the viscosity change affects the rheology of the drilling fluid. In addition, the fluid loss characteristic of the drilling fluid could change as the encapsulating polymers often work synergistically with the fluid loss agents.

Therefore, it would be advantageous to have a polymer for use in water-based drilling fluids that does not significantly lose viscosity at high temperatures over time.

SUMMARY

An embodiment of the disclosure is a method of encapsulating particulate matter in a water-based drilling fluid with a composition comprising a crosslinked high molecular weight acrylamide and 2-acrylamido-2-methylpropane sulfonic acid copolymer, wherein the acrylamide is 50-95%; the 2-acrylamido-2-methylpropane sulfonic acid is 5-50%; and the crosslinker is 5-500 ppm. In an embodiment, the particulate matter is shale cuttings. In an embodiment, the copolymer concentration is 25-35%. In an embodiment, the copolymer concentration is 30%. In an embodiment, the acrylamide and 2-acrylamido-2-methylpropane sulfonic acid copolymer is crosslinked by N, N'-methylene-bis-acrylamide. In an embodiment, the application dosage is 0.05-0.3%. In an embodiment, the application dosage is 0.1%. In an embodiment, the application dosage is 0.2%. In an embodiment, the application dosage is 0.3%. In an embodiment, the crosslinked high molecular weight acrylamide and 2-acrylamido-2-methylpropane sulfonic acid copolymer are in an inverse emulsion form. In an embodiment, the specific viscosity of the solution of the crosslinked high molecular weight acrylamide and 2-acrylamido-2-methylpropane sulfonic acid copolymer does not change more than 20% after heating at 350° F. for 16 hours. In an embodiment, the crosslinked high molecular weight acrylamide and 2-acrylamido-2-methylpropane sulfonic acid copolymer comprises 90% acrylamide and 10% 2-acrylamido-2-methylpropane sulfonic acid. In an embodiment, the acrylamide is 80-95%. In an embodiment, the 2-acrylamido-2-methylpropane sulfonic acid is 5-20%. In an embodiment, the crosslinker is 5-200 ppm. In an embodiment, the production of the well is enhanced.

An embodiment of the disclosure is a crosslinked high molecular weight copolymer for encapsulating particulate matter in a water-based drilling fluid comprising 50-95% acrylamide; 5-50% 2-acrylamido-2-methylpropane sulfonic acid; and the 5-500 ppm crosslinker. In an embodiment, the copolymer comprises 80-95% acrylamide; 5-20% 2-acrylamido-2-methylpropane sulfonic acid; and the 5-200 ppm crosslinker.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
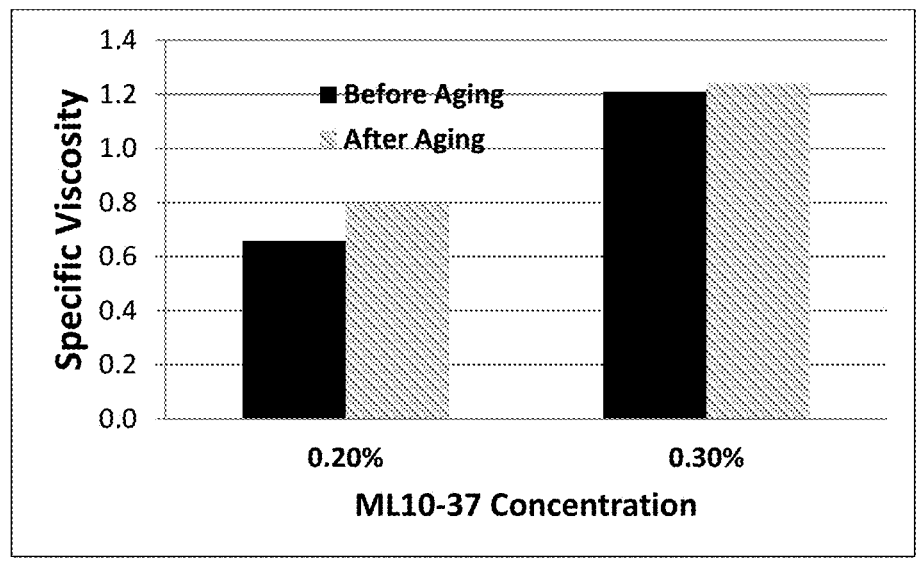
FIG. 1 depicts a graph of the specific viscosity before and after aging at 350° F. for 16 hours.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "encapsulation" means and refers to the coating of one material with another material.

As used herein, the term "crosslinker" means and refers to a bond, atom, or group of atoms that connect chains of atom.

As used herein, the term "viscosity" means and refers to the property of a fluid that resists the force tending to cause the fluid to flow. Viscosity is the measure of a fluid's resistance to flow. High viscosity fluids have a lot of internal friction. Low viscosity fluids have little internal friction. The term "specific viscosity" is a measure of the polymer's contribution to the viscosity of the polymer solution, expressed as the ratio of the absolute viscosity of the polymer solution to that of a reference fluid (a saturated NaCl solution in Example 1).

As used herein, the term "rheology" means and refers to the flow and deformation of matter.

As used herein, the term "inverse emulsion polymerization" means and refers to hydrophilic monomers, frequently in aqueous solution, emulsified in a continuous oil phase using water-in-oil emulsifying surfactants and polymerized in the presence of water-soluble or oil-soluble initiators. The products comprise of water-swollen, hydrophilic polymer colloidal particles suspended in the continuous oil phase.

Crosslinked high molecular weight acrylamide and 2-acrylamido-2-methylpropane sulfonic acid copolymers in inverse emulsion form have been determined to be useful inhibitive and encapsulating agents for water-based drilling fluids system, particularly for high salt, high density drilling fluids in high temperature and high pressure applications. The copolymers have good salt tolerance and can be used in fresh water, sea water and saturated salt water. The copolymers disclosed have excellent thermal stability and improve the thermal stability of high performance water-based drilling fluids. Therefore, well production can be enhanced. The copolymers are excellent shale inhibitive and encapsulating agents in high performance water-based drilling fluids at temperatures higher than 350° F.

Crosslinked high molecular weight acrylamide and 2-acrylamido-2-methylpropane sulfonic acid copolymers act as inhibitive and encapsulating agents for cuttings or other particulate components in water-based drilling fluids. In an embodiment, the particulate matter is clay, rock particles, or shale cuttings. In an embodiment, other components than cuttings can be encapsulated.

Acrylamide and 2-acrylamido-2-methylpropane sulfonic acid copolymers with 10-500 ppm crosslinker added during an inverse emulsion copolymerization process were discovered to have a viscosity change of less than 20% after aging at 350° F. for 16 hours when the specific viscosity of the copolymer solutions were obtained by capillary viscometry at application concentration. (FIG. 1). In an embodiment, the crosslinker is N, N'-methylene-bis-acrylamide (BAAm or MBA); ethylene glycol dimethacrylate (EGDMA); divinyl sulfone; diethyleneglycol diallyl ether; PEG 200 diacrylate; PEG 400 diacrylate; polymethyleneglycol diacrylate; ethyleneglycol diacrylate; and polyethyleneglycol diacrylate. In an embodiment, the crosslinker is present at 5-500 ppm. In another embodiment, the crosslinker is present at 5-200 ppm.

The acrylamide and 2-acrylamido-2-methylpropane sulfonic acid copolymers with crosslinker added during an inverse emulsion copolymerization process were tested in dispersion tests. In an embodiment, 10-500 ppm crosslinker is added. The copolymer showed excellent encapsulating and inhibitive effect to Pierre II Shale cuttings. (FIG. 2) The solutions also have shown lower viscosity, and therefore, less rheology impact to the drilling fluid system.

In an embodiment, crosslinked high molecular weight acrylamide and 2-acrylamido-2-methylpropane sulfonic acid copolymers are 50-95% acrylamide monomer, 5-50% 2-acrylamido-2-methylpropane sulfonic acid monomer, and 5-500 ppm crosslinking monomer. In an embodiment, the crosslinked high molecular weight acrylamide and 2-acrylamido-2-methylpropane sulfonic acid copolymer is ML10-37. ML10-37 comprises 10% 2-acrylamido-2-methylpropane sulfonic acid and 90% acrylamide. In an embodiment, the concentration of ML10-37 in a solution is 0.1%, 0.2%, or 0.3%. In an embodiment, the solution is a NaCl solution.

The application dosage is between 0.05-0.3%. In an embodiment, the application dosage is 0.1-0.2%.

In an embodiment, the copolymers are in an inverse emulsion form at a concentration of 25-35% (hydrophilic emulsified in the oil phase).

In an embodiment, the specific viscosity of the crosslinked high molecular weight acrylamide and 2-acrylamido-2-methylpropane sulfonic acid copolymers changes less than 20% after aging for 16 hours at 350° F. In an embodiment, the specific viscosity of the crosslinked high molecular weight acrylamide and 2-acrylamido-2-methylpropane sulfonic acid copolymers changes less than 10% after aging for 16 hours at 350° F. In an embodiment, the specific viscosity of the crosslinked high molecular weight acrylamide and 2-acrylamido-2-methylpropane sulfonic acid copolymer changes less than 5% after aging for 16 hours at 350° F.

EXAMPLES

Example 1

Specific viscosity test by capillary viscometry: 0.2 and 0.3% polymer solutions of ML10-37, a crosslinked high molecular weight acrylamide and 2-acrylamido-2-methylpropane sulfonic acid copolymer with 10-500 ppm crosslinker in inverse emulsion form, were aged in static aging cells at 350° F. for 16 hours. The specific viscosity of polymer solutions was measured using capillary viscometer before and after aging. As shown in FIG. 1, the polymer solutions' specific viscosity changed less than 20% before and after aging.

Example 2

Figure 2:
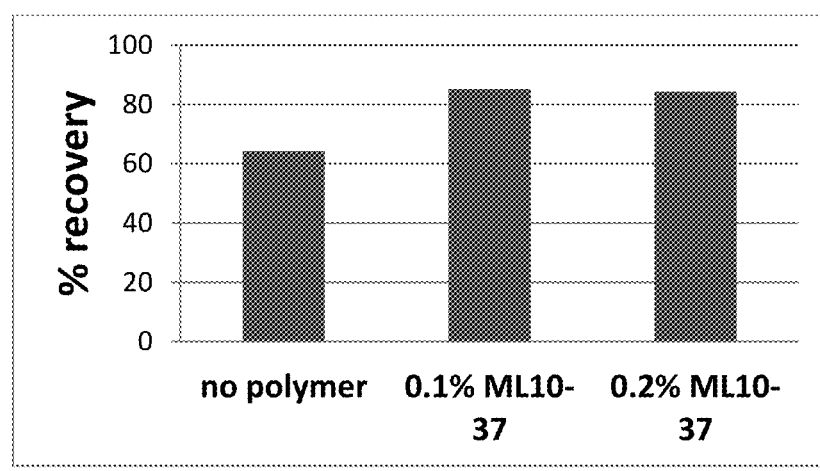
FIG. 2 depicts a graph of the percent recovery of Pierre II shale cuttings in saturated NaCl solutions.

Dispersion test: A dispersion test was used to evaluate the encapsulating and inhibitive properties to shale cutting of the disclosed polymers in this invention. Pierre II type if shale cuttings (20 gram) were added to saturated NaCl solution containing 0.1 and 0.2% polymer of ML10-37, a crosslinked high molecular weight acrylamide and 2-acrylamido-2-methylpropane sulfonic acid copolymer in inverse emulsion form. Resulted mixtures were hot rolled at 150° F. for 16 hours. The cuttings were recovered, dried at 212° F. overnight and weighted. The % recovery was calculated. The higher the % recovery, the better the encapsulating and inhibitive performance. As shown in FIG. 2, in concentration as low as 0.1%, ML10-37 showed excellent encapsulating and inhibitive performance.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A method of encapsulating a particulate matter in a water-based drilling fluid comprising having a water-based drilling fluid; adding a composition comprising a cross-linked high molecular weight acrylamide and 2-acrylamido-2-methylpropane sulfonic acid copolymer into the water-based drilling fluid, wherein the acrylamide is 50-95%; the 2-acrylamido-2-methylpropane sulfonic acid is 5-50%, and the crosslinker is 5-500 ppm; and encapsulating the particulate matter with the composition, wherein the particulate matter is shale cuttings.

2. The method of claim 1 wherein the copolymer concentration is 25-35%.

3. The method of claim 2 wherein the copolymer concentration is 30%.

4. The method of claim 1 wherein the acrylamide and 2-acrylamido-2-methylpropane sulfonic acid copolymer is crosslinked by N, N'-methylene-bis-acrylamide.

5. The method of claim 1 wherein an application dosage is 0.05-0.3%.

6. The method of claim 5 wherein the application dosage is 0.1%.

7. The method of claim 5 wherein the application dosage is 0.2%.

8. The method of claim 5 wherein the application dosage is 0.3%.

9. The method of claim 1 wherein the crosslinked high molecular weight acrylamide and 2-acrylamido-2-methylpropane sulfonic acid copolymer are in an inverse emulsion form.

10. The method of claim 1 wherein the specific viscosity of the solution of the crosslinked high molecular weight acrylamide and 2-acrylamido-2-methylpropane sulfonic acid copolymer does not change more than 20% after heating at 350° F. for 16 hours.

11. The method of claim 1 wherein the crosslinked high molecular weight acrylamide and 2-acrylamido-2-methylpropane sulfonic acid copolymer comprises 90% acrylamide and 10% 2-acrylamido-2-methylpropane sulfonic acid.

12. The method of claim 1 wherein the acrylamide is 80-95%.

13. The method of claim 1 wherein the 2-acrylamido-2-methylpropane sulfonic acid is 5-20%.

14. The method of claim 1 wherein the crosslinker is 5-200 ppm.

\* \* \* \* \*